United States Patent
Fukase et al.

(10) Patent No.: US 9,577,495 B2
(45) Date of Patent: Feb. 21, 2017

(54) ROTARY ELECTRIC MACHINE

(75) Inventors: Tatsuya Fukase, Tokyo (JP); Masahiko Fujita, Tokyo (JP); Dai Nakajima, Tokyo (JP); Hitoshi Isoda, Tokyo (JP); Naohide Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 201 days.

(21) Appl. No.: 14/123,413

(22) PCT Filed: Nov. 9, 2011

(86) PCT No.: PCT/JP2011/075804
§ 371 (c)(1),
(2), (4) Date: Jan. 8, 2014

(87) PCT Pub. No.: WO2013/069105
PCT Pub. Date: May 16, 2013

(65) Prior Publication Data
US 2014/0125168 A1   May 8, 2014

(51) Int. Cl.
*H02K 9/28* (2006.01)
*H02K 5/10* (2006.01)
*H02K 9/02* (2006.01)

(52) U.S. Cl.
CPC ............................ *H02K 9/28* (2013.01);
*H02K 5/10* (2013.01); *H02K 9/02* (2013.01);
*H02K 11/33* (2016.01)

(58) Field of Classification Search
CPC ............. H02K 9/02; H02K 9/28; H02K 5/10;
H02K 11/0073
See application file for complete search history.

(56) References Cited

U.S. PATENT DOCUMENTS

| 6,294,856 | B1 * | 9/2001 | Ishida | ..................... H02K 9/28 310/232 |
| 6,515,398 | B1 * | 2/2003 | Fudono | ................. H02K 5/141 310/239 |
| 7,417,353 | B2 * | 8/2008 | Wada | ...................... H02K 9/28 310/239 |
| 7,619,333 | B2 * | 11/2009 | Koumura | ............ H02K 11/046 310/58 |

(Continued)

FOREIGN PATENT DOCUMENTS

| EP | 1 357 659 A1 | 10/2003 |
| JP | 2004-274992 A | 9/2004 |

(Continued)

OTHER PUBLICATIONS

Communication dated Oct. 13, 2015, issued by the European Patent Office in corresponding European Application No. 11875442.3.

*Primary Examiner* — Dang Le
(74) *Attorney, Agent, or Firm* — Sughrue Mion, PLLC; Richard C. Turner

(57) ABSTRACT

A rotary electric machine including a brush used to supply a field current to a field winding of a rotor, a brush holder holding the brush, a power circuit portion connected to a heat sink having fins, and a case covering the power circuit portion and the brush holder. An air passage is provided between the brush holder and the fins of the heat sink, and an opening is provided to the case so as to cover component members of the brush holder in a shape conforming to an outer peripheral portion of the brush holder, from which cooling air is allowed to pass through the air passage.

6 Claims, 6 Drawing Sheets

(56) References Cited

U.S. PATENT DOCUMENTS

2002/0050750 A1    5/2002   Oohashi et al.
2006/0125240 A1    6/2006   Kato et al.
2011/0193432 A1    8/2011   Takechi et al.

FOREIGN PATENT DOCUMENTS

JP    2006-166681 A    6/2006
JP    2007-202253 A    8/2007

* cited by examiner

ROTARY ELECTRIC MACHINE

CROSS REFERENCE TO RELATED APPLICATIONS

This application is a National Stage of International Application No. PCT/JP2011/075804, filed on Nov. 9, 2011, the contents of all of which are incorporated herein by reference in their entirety.

TECHNICAL FIELD

The present invention relates to a rotary electric machine for belt-driven vehicle connected to an engine and to a rotary electric machine for vehicle equipped with a control device that controls a rotary electric machine for belt vehicle.

BACKGROUND ART

In the related art, for example, in a field winding rotary electric machine for vehicle, component members are being highly integrated due to downsizing of a rotary electric machine and upsizing of wiring members to meet the demands for improvement of fuel efficiency and a higher output.

Members forming a rotary electric machine are reduced in size and installed in a crammed fashion to meet the demand that the rotary electric machine be downsized, and clearances among the members are becoming smaller. In particular, wirings are becoming more complicated in a motor generator that includes an inverter portion formed of power semiconductor elements performing switching operations in the interior than in an alternator that uses a rectifier formed of diode elements. Accordingly, a degree of integration of component members in the interior of the rotary electric machine becomes higher.

Further, to meet the demand for a higher output, a current flowing to brushes that supply a field current to the power semiconductor elements and a field winding, a field winding portion provided to a rotor, and an armature winding portion provided to a stator is increasing and so is an amount of heat generated in the respective portions. Herein, there may be a need to upsize the members depending on magnitude of the current.

Also, a brush holder that holds the brush and protects the brush from foreign matter from the outside is attached to the brush. The brush holder is installed in the vicinity of a power circuit portion from its current path. For these reasons, arrangement density of component members is particularly high in the periphery of the power circuit portion and the brush portion.

However, the structure of the rotary electric machine allows foreign matter, such as dust, to readily enter the vicinity of the power portion and the brush holder. Although the rotary electric machine is installed inside the engine room of the vehicle, a member, such as a housing, is provided with a large number of openings for intake of cooling air. Foreign matter, such as dust and a corrosion product produced by salt water, coming inside from these openings enters the interior of the rotary electric machine.

In such cases, foreign matter, such as dust and a corrosion product produced by salt water, deposits in the vicinity of a heat sink connected to a power module and the brush holder and eventually clogs a ventilation path of cooling air or fins of the heat sink or causes a deficiency arising from a short circuit between current-passing members. Consequently, the rotary electric machine suffers a breakdown or an operational failure and cooling performance for the component members is deteriorated.

Also, in the rotary electric machine for vehicle, a field current is supplied from the brush to the field winding of the stator via a slip ring. In this instance, the brush slides while being pressed against the slip ring by a spring attached behind the brush. The brush and the slip ring generate heat caused by an electrical loss in the sliding portion, sliding friction, and electrical losses in their own current-passing paths. A pair of the slip ring and the brush is provided on each of a plus side and a minus side. Hence, in order to ensure electrical insulation between the plus side and the minus side, the brushes and the slip rings are generally covered with insulating resin or the like and retained. In addition, the brush holder storing the brush therein prevents entry of foreign matter and moisture from the outside and is also furnished with a function of discharging brush abrasion powder.

Hence, a slight clearance is provided to discharge brush abrasion powder. However, a percentage of cooling air generated by a cooling fan installed to the rotor and supplied to an abutting portion of the slip ring and the brush is small. Because of these factors, the slip rings and the brushes become hot particularly at the abutting portion.

For example, PTL 1 (JP-A-2006-166681) describes a rotary electric machine for vehicle. This rotary electric machine for vehicle has a power circuit portion formed of switching elements and a pair of inverter modules connected to the switching elements in parallel and a control circuit portion that controls the power circuit portion. With respect to a flow of cooling air generated by a centrifugal fan firmly attached to the rotor, the control circuit portion is installed upstream and the power circuit portion is separately installed downstream. The control circuit portion is provided with a through-hole so that the cooling air flows linearly by way of the power circuit portion.

Also, PTL 2 (JP-A-2004-274992) describes an idling stop control device. This control device includes switching elements directly fixed onto a heat sink of substantially a disc shape and a circuit board having a printed wiring layer fixed onto the heat sink. A control IC and the like are attached onto this circuit board. Double side-frame portions are attached along an entire outer periphery and an entire inner periphery of the heat sink. The heat sink is fixed to a rear-end outer wall of a bracket via the outer peripheral side-frame portion. A ring-like concave portion surrounded by the inner and outer peripheral side-frame portions of the heat sink is filled with resin. Owing to this structure, the switching elements, the circuit board, the control IC, and the like are readily protected from environmental factors, such as brine mud water. Hence, durability and reliability can be enhanced.

Also, the control device has a cooling structure by which a resin cover covering the heat sink is fixed to the bracket, and cooling air flowing in from air inlet holes provided to the resin cover flows into the bracket while cooling the heat sink and is blown off to the outside from the bracket after it cools the stator winding and the rotor winding.

CITATION LIST

Patent Literature

PTL 1: JP-A-2006-166681
PTL 2: JP-A-2004-274992

SUMMARY OF INVENTION

Technical Problem

In the rotary electric machine in the related art in PTL 1 described above, the control circuit portion is installed more on the rear side of the rotary electric machine than a portion in which the power circuit portion and the brush holders are installed. This structure has a problem that the area of a ventilation path through which cooling air flows to the periphery of the power circuit portion and the brush holders becomes smaller. Also, in a case where foreign matter, such as dust, and a corrosion product enter the vicinity of the power circuit portion, there is no specific foreign matter discharge path. Hence, there is a problem that foreign matter deposits and eventually causes electric erosion or clogs the fins.

In the rotary electric machine in the related art in PTL 2 described above, cooling air is forced to flow in by the fan. Herein, the cooling air that comes inside from the air inlet holes of the resin cover flows toward the center above the heat sink of substantially a disc shape, then flows to the interior of the bracket by passing a slight clearance on the inner peripheral side of the heat sink, and is blown off from the bracket in a radial direction. Hence, a pressure loss and a loss at the bending of a cooling air passage of the cooling air are large and cooling efficiency is poor. Also, because the cooling air passing the vicinity of the brush holders receives heat from the power circuit portion, there is a problem that a brush cooling effect is not satisfactory.

The invention was devised to solve the problems in the related art discussed above and is to provide a rotary electric machine from which foreign matter, such as dust, and a corrosion product can be readily discharged and in which a cooling operation can be performed efficiently.

Solution to Problem

A rotary electric machine of the invention includes a rotation shaft supported on a housing in a rotatable manner, a stator fixed to the housing and having an armature winding, a rotor fixed to the rotation shaft and having a field core and a field winding, a brush used to supply a field current to the field winding, a brush holder holding the brush, a power circuit portion fixed to a rear side of the housing and connected to a heat sink having fins, and a case covering the power circuit portion and the brush holder. In this rotary electric machine, an air passage is provided between the brush holder and the fins of the heat sink, and an opening is provided to the case so as to cover component members of the brush holder in a shape conforming to an outer peripheral portion of the brush holder, from which cooling air is allowed to pass through the air passage.

Advantageous Effects of Invention

According to the rotary electric machine of the invention, it becomes possible to obtain a rotary electric machine from which foreign matter, such as dust, and a corrosion product can be readily discharged and in which a cooling operation can be performed efficiently.

BRIEF DESCRIPTION OF DRAWINGS

FIG. 3 is a view schematically showing an outward appearance of a power circuit portion in the rotary electric machine according to the first embodiment of the invention, wherein

FIG. 4 is a view schematically showing an outward appearance of a brush holder in the rotary electric machine according to the first embodiment of the invention, wherein

FIG. 5 is a view schematically showing an outward appearance of a brush holder in a rotary electric machine according to a second embodiment of the invention, wherein

FIG. 6 is a perspective view of a portion in which a heat sink and a brush holder are provided in a rotary electric machine in the related art, wherein

DESCRIPTION OF EMBODIMENTS

First Embodiment

Figure 1:
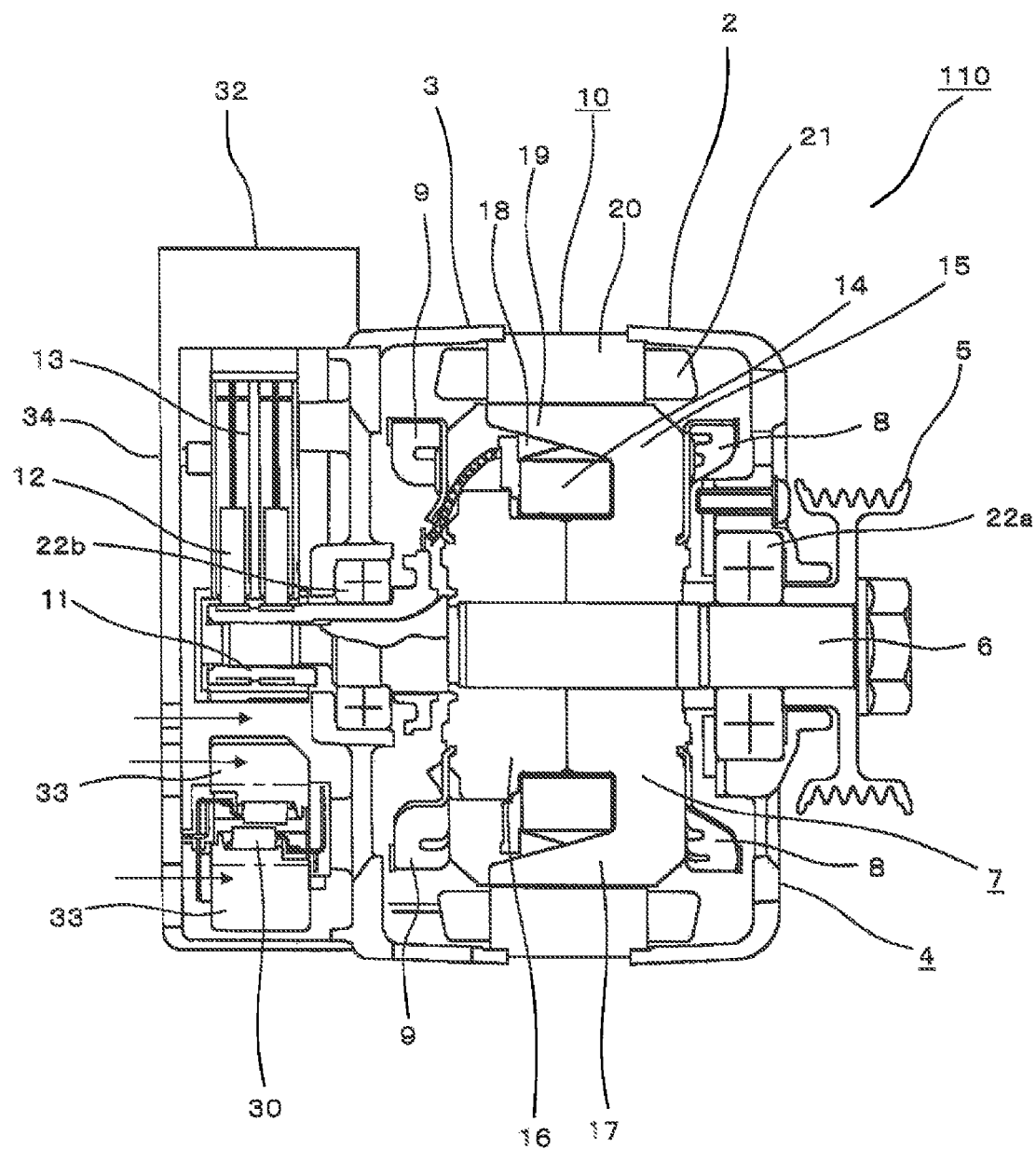
FIG. 1 is a cross section showing a rotary electric machine according to a first embodiment of the invention.
Figure 2:
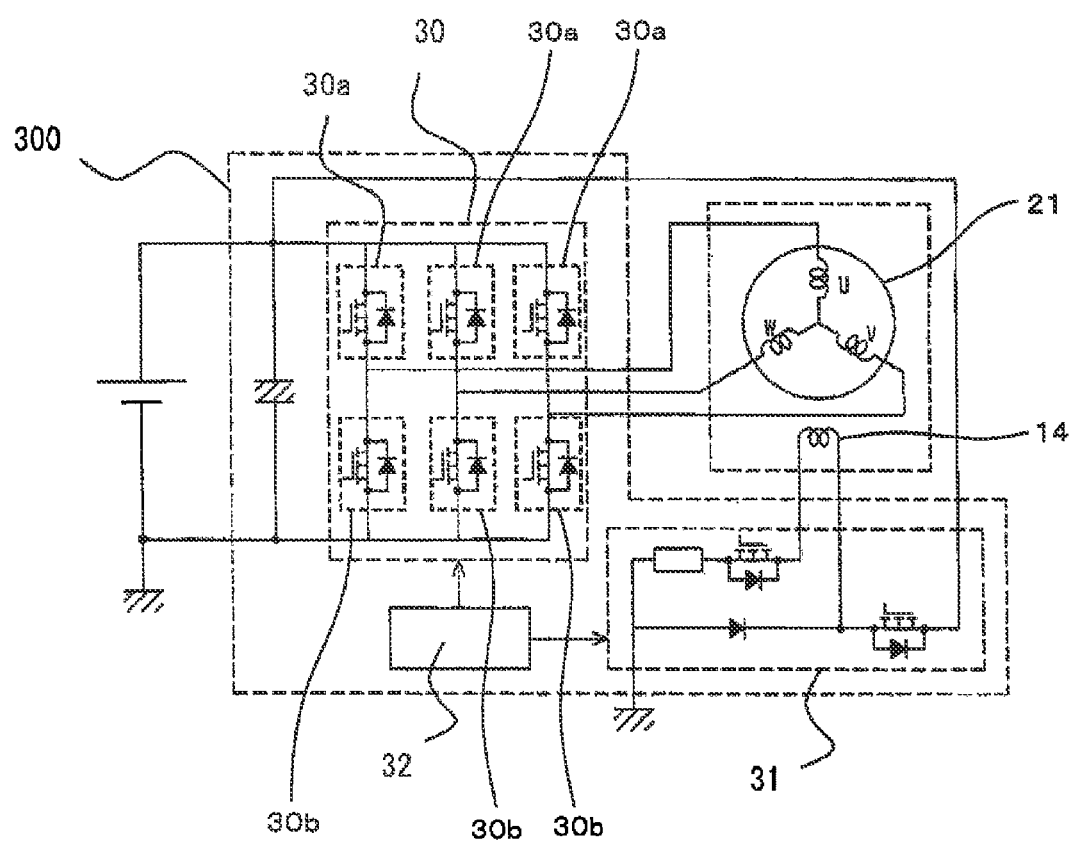
FIG. 2 is a circuit diagram showing the rotary electric machine according to the first embodiment of the invention.
Figure 3A:
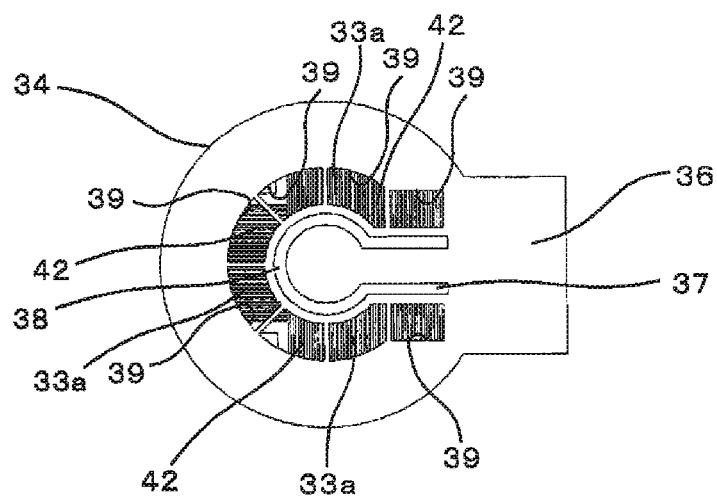
FIG. 3A is a plane view.
Figure 3B:
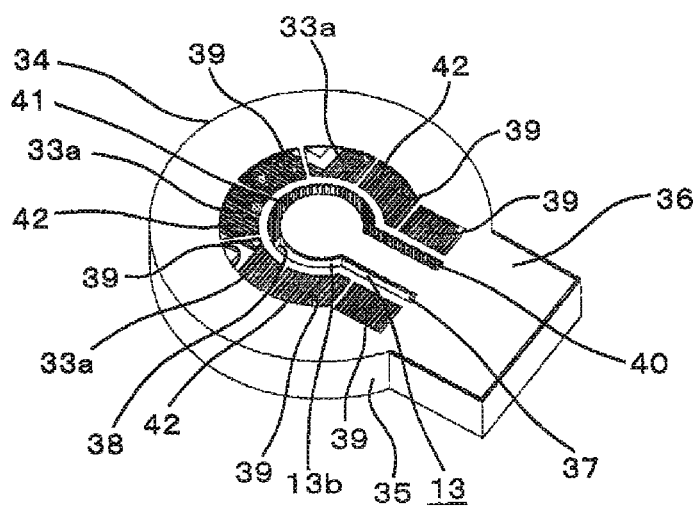
FIG. 3B is a perspective view.
Figure 3C:
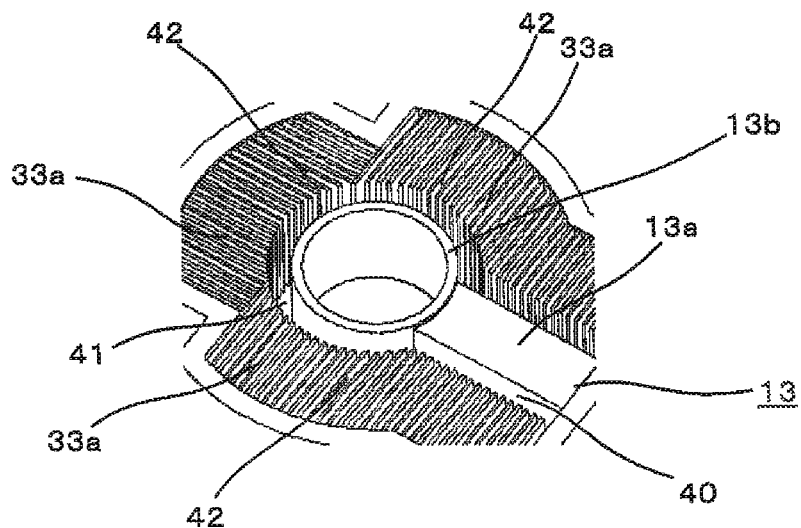
FIG. 3C is a perspective view of a major portion.
Figure 4A:
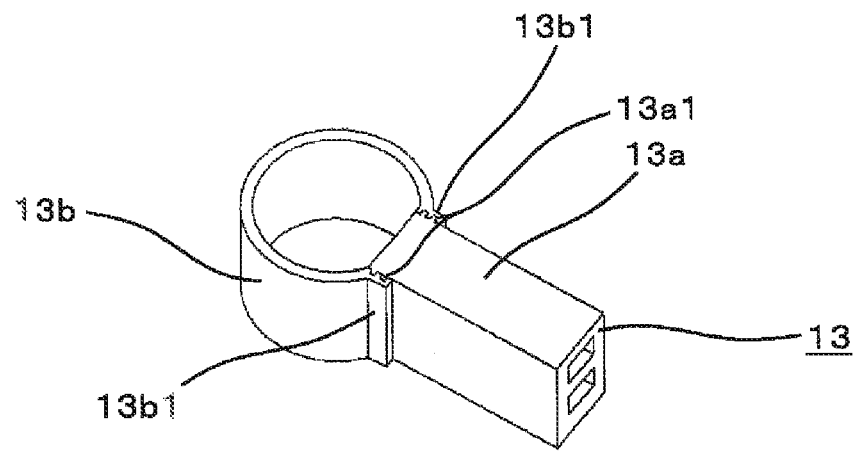
FIG. 4A is a perspective view and FIG. 4B is a developed perspective view.
Figure 4B:
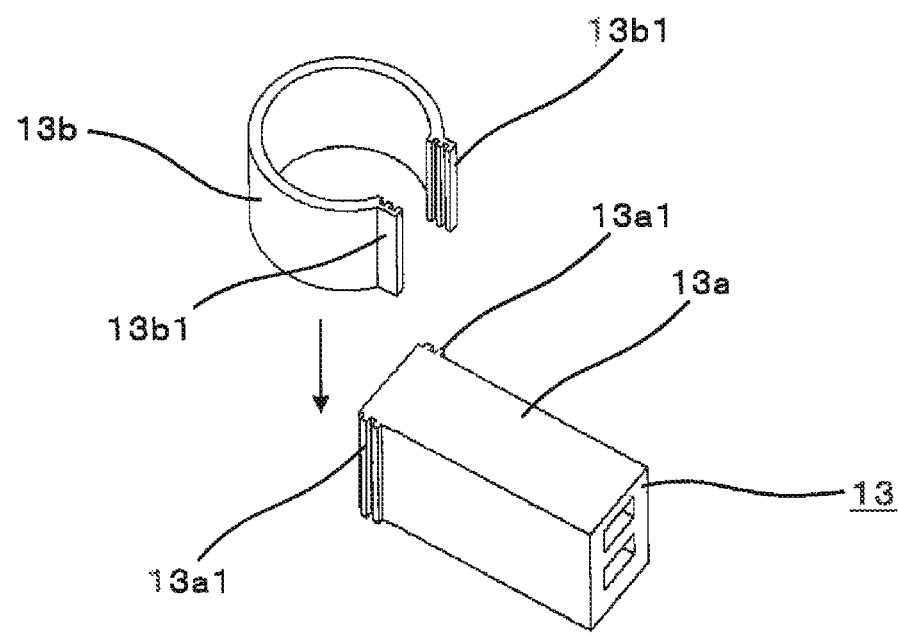

Hereinafter, a first embodiment of the invention will be described using FIG. 1 through FIGS. 5A-5B and descriptions will be given by labeling same or equivalent members and portions with same reference numerals in the respective drawings. FIG. 1 is a cross section showing a rotary electric machine according to the first embodiment of the invention. FIG. 2 is a circuit diagram showing the rotary electric machine according to the first embodiment of the invention. FIGS. 3A-3C is a view schematically showing an outward appearance of a power circuit portion in the rotary electric machine according to the first embodiment of the invention. FIGS. 4A-4B is a view schematically showing an outward appearance of a brush holder in the rotary electric machine according to the first embodiment of the invention. The rotary electric machine described in the first embodiment is an AC motor generator for vehicle. It should be appreciated, however, that this rotary electric machine is also applicable to an AC generator for vehicle.

Referring to FIG. 1, the rotary electric machine 100 of the first embodiment includes: a housing 4 formed of a front bracket 2 and a rear bracket 3 both made, for example, of aluminum; a rotation shaft 6 provided inside the housing 4 in such a manner that a pulley 5 is attached at an axial end on the side of the front bracket 2 while being supported in a rotatable manner via a bearing 22a of the front bracket 2 and a bearing 22b of the rear bracket 3; a rotor 7 attached to the rotation shaft 6, a front fan 8 formed, for example, of a centrifugal fan and attached to the rotor 7 on the side of the front bracket 2 to generate cooling air; a rear fan 9 formed, for example, of a centrifugal fan and attached to the rotor 7 on the side of the rear bracket 3 to generate cooling air; a stator 10 fixed to the front bracket 2 and the rear bracket 3 on an inner wall surface in the housing 4; a pair of slip rings 11 attached to a rear end of the rotation shaft 6 to supply a field current to the rotor 7; a pair of brushes 12 coming into sliding-contact with the slip rings 11; and brush holders 13 storing the brushes 12 therein and fixed on the side of the rear bracket 3 so as to position in the rear-side outer periphery of the rotation shaft 6.

The rotary electric machine 100 is connected to a rotation shaft (not shown) of the engine via a belt (not shown) pulled over the pulley 5. Temperatures of the rotor 7 and the stator 10 rise due to heat generated while the rotary electric machine 100 is driven. Accordingly, the front fan 8 and the rear fan 9 for cooling are provided at the both ends of the rotor 7 in an axial direction. A field current is supplied to the rotor 7 from the brush holders 13 having the slip rings 11 and fixed on the side of the rear bracket 3 via the brushes 12.

The rotor 7 is formed by winding a conducting wire and includes a field winding 14 that generates a magnetic flux when a current is passed and a field core 15 that is provided so as to cover the field winding 14 and forms a magnetic pole using the magnetic flux.

The field core 15 is formed of a pair a first pole core body 16 and a second pole core body 17 that are engaged alternately. The first pole core body 16 and the second pole core body 17 are made of iron and have claw-like magnetic poles 18 and 19 of a claw shape, respectively. The respective adjacent claw-like magnetic poles 18 and 19 are provided in such a manner so as to prevent a magnetic flux from leaking between the both claw-like magnetic poles and to form a certain pole-to-pole clearance serving as a cooling air passage to cool the field winding 14.

The stator 10 includes a stator core 20 and an armature winding 21 formed by winding a conducting wire in slots (not shown) of the stator core 20 so as to generate an AC from a variance of the magnetic flux from the field winding 14 in association with rotations of the rotor 7. The armature winding 21 is formed by connecting, for example, three winding portions (not shown) by a 3-phase AC winding such as a 3-phase wye connection or a 3-phase delta connection.

The rotary electric machine 100 includes, on the side of the rear bracket 3, a power circuit portion 30 that converts DC power to AC power or AC power to DC power, a field circuit portion 31 that supplies a field current to the field winding 14 of the rotor 7, and a control circuit portion 32 that controls the power circuit portion 30 and the field circuit portion 31. The rotary electric machine 100 is connected to the outside via an outside connection connector (not shown) and a power-supply terminal (not shown).

The power circuit portion 30 includes a plurality of power elements 30a and 30b and a heat sink 33 serving also as an electrode member electrically connected to the power elements 30a and 30b. The respective power elements 30a and 30b are connected by a conducive member (not shown) insert-molded with resin and the heat sink 33 and electrically connected to the control circuit portion 32 by a relay wiring member (not shown).

The power circuit portion 30, the control circuit portion 32, and the heat sink 33 are stored in a case 34 attached to the rear bracket 3. The case 34 is formed of a case frame 35 and a lid 36.

Herein, the control circuit portion 32 shown in FIG. 1 includes a control circuit board (not shown) and a resin case (not shown) in which to store the control circuit board. The case has a water-proof structure using a cover portion (not shown) or the like so as to prevent entry of brine mud water in the control circuit board. The field circuit portion 31 may be mounted on the same substrate on which the control circuit board is mounted or formed separately from the control circuit board.

As is shown in the circuit diagram of FIG. 2, the power circuit portion 30, the field circuit portion 31, and the control circuit portion 32 together form a power ASSY 300. The outside connection connector is installed in close proximity to the control circuit portion 32 and electrically connected to the control circuit portion 32.

The power elements 30a and 30b forming the power circuit portion 30 generate heat when a current is passed. Hence, the power portion is provided with the heat sink 33 to release heat of the power elements 30a and 30b. The heat sink 33 is provided with a large number of fins 33a to prevent an excessive temperature rise of the power elements 30a and 30b.

In particular, the motor generator includes the power circuit portion 30 that is internally furnished with a rectifier function and an inverter function for a generated current. The power circuit portion 30 is provided in the form of a power module by using switchable power semiconductors, such as MOS-FETs, as the power elements 30a and 30b forming the power circuit portion 30, which are transfer-molded together with a wiring member or a heat-releasing member or which are covered by a case or a fence made of resin and potted with silicone gel.

The heat sink 33 is connected to the power module of the power circuit portion 30. The power module is therefore furnished with a function of releasing heat generated in the power elements 30a and 30b during passage of a current to cooling air. In comparison with a rectifier formed of diode elements and used in an alternator, the power circuit portion 30 of the motor generator has more complex wirings and is larger in size due to upsizing of the power module it forms. Also, the brush holders 13 holding the brushes 12 that supply a field current to the field winding 14 are installed in the vicinity of the power circuit portion 30. For these reasons, arrangement density of component members is high on the periphery of the power circuit portion 30 and the brushes 12.

The rotary electric machine 100 for vehicle is, however, of a structure that allows foreign matter, such as dust, to readily enter the vicinity of the power circuit portion 30 and the brush holders 13. Also, although the rotary electric machine 100 is installed inside the vehicle engine room, the rotary electric machine 100 is exposed to foreign matter, such as salt water, that gives rise to corrosion of rotary electric machine component members.

In these cases, clogging caused by deposition of dust and a corrosion product is likely to occur in the vicinity of the heat sink 33 connected to the power module of the power circuit portion 30, a connection portion of the armature winding 21 to the power circuit portion 30, or the brush holders 13. Accordingly, there arises a problem that a current may leak from current-passing members to nearby members, and in the case of a cooling member or members forming a cooling air passage, cooling performance is deteriorated.

In the field winding rotary electric machine 100 shown in FIG. 1, a field current from the field circuit portion 31 is supplied via the brushes 12 held in the brush holders 13 fixed to the rear bracket 3 and the slip rings 11 attached to the rotation shaft 6. Because the fixed brushes 12 and the rotating slip rings 11 come into contact with each other, the sliding portion of the brushes 12 and the slip rings 11 generate heat by friction of the both members.

Also, because the sliding portion is maintained in a state in which the brushes 12 and the slip rings 11 are in contact with each other, heat is also generated by electrical resistance of the contact portion. Further, Joule heat is generated in the respective members at the same time by passing a current.

A function of preventing entry of foreign matter and water from the outside is provided between the brush holders 13 and the slip rings 11 and there is a slight clearance through which to release brush frictional powder. However, air hardly flows between atmosphere in the outer periphery portion of the brush holder 13 and internal air of the brush holder 13. For these reasons, there is a problem that the brush temperature rises, which shortens the life span of the brushes.

In the rotary electric machine that performs regenerative power generation and an engine start-up operation like the motor generator, a current larger than the one during the power generation operation flows in a short time. In this instance, the brush portion undergoes an abrupt temperature rise. In such a case, there is a concern that the resin forming the brush holders 13 is softened or melted and causes a functional defect.

Accordingly, as will be described below, the first embodiment has air passages 40 and 41 that have a clearance between the fins 33a of the heat sink 33 of the power circuit portion 30 and the brush holders 13 and allow the cooling air to readily flow, while air passages 42 among the fins 33a of the heat sink 33 are provided among the fins 33a of the heat sink 33 so as to oppose the air passages 40 and 41.

Figure 6A:
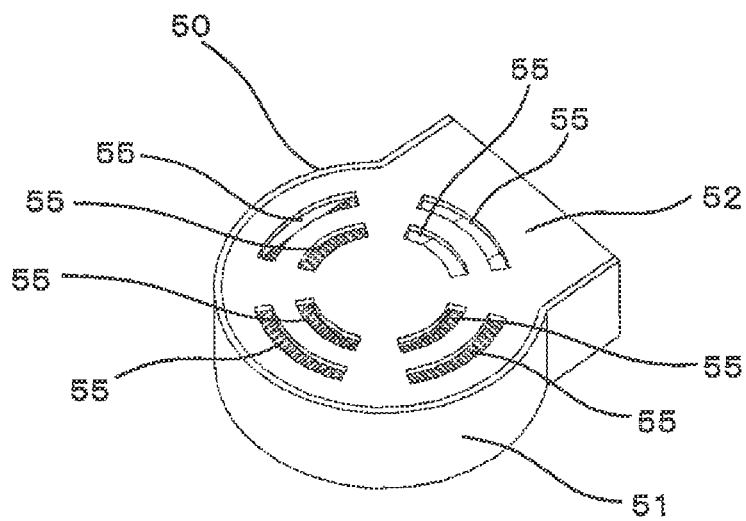
FIG. 6A is a perspective view of a case 50 in which to store the power circuit portion and the like and FIG. 6B is a perspective view of the case 50 when a lid 52 is removed.
Figure 6B:
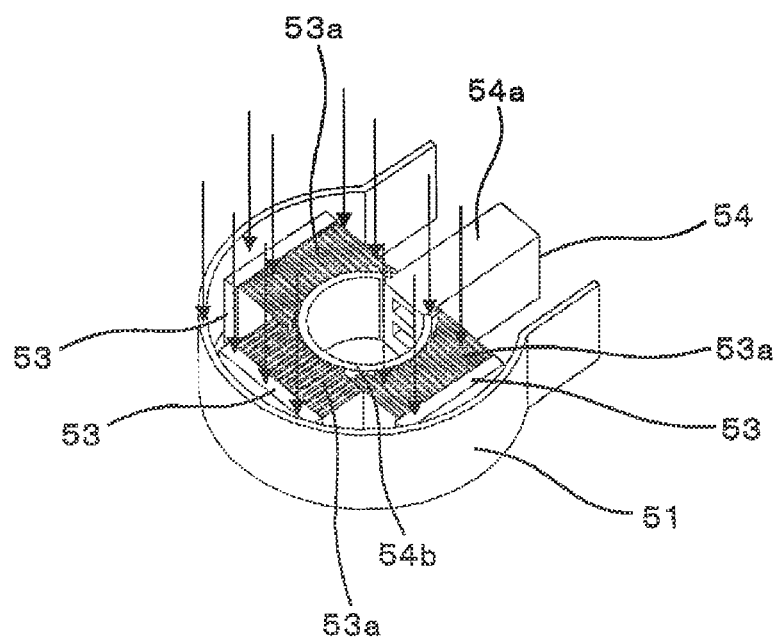

For ease of understanding of the invention, an example in the related art will now be described. FIG. 6 is a perspective view of a portion in which a heat sink 53 and a brush holder 54 are provided in a power circuit portion in the related art used in an AC generator or a motor generator for vehicle. FIG. 6 shows a rotary electric machine of a type in which the power circuit portion and the brush holder 54 are provided to the rear bracket 3 and wiring members and a power module are omitted. FIG. 6A is a perspective view of a case 50 in which to store the power circuit portion and the like and FIG. 6B is a perspective view of the case 50 when a lid 52 is removed.

The heat sink 53 of the power circuit portion is installed in such a manner that maximum-area surfaces of fins 53a become parallel to a longitudinal direction of a rotation shaft 6 so as to surround a cover portion 54b integrally connected to a brush storing portion 54a of the brush holder 54.

In the rotary electric machine of this type, a case frame 51 generally surrounds a portion in which the power circuit portion and the brush holder 54 are provided. The lid 52 of the case frame 51 is provided with openings 55 as inlets of cooling air generated by the rear fan 9 formed of a centrifugal fan and fixed to the rotor 7.

The openings 55 provided to the lid 52 are formed in an arc shape divided in a circumferential direction and arranged in two layers in a radial direction. Cooling air from these arc-shaped openings 55 passes by the periphery of the power circuit portion and is drawn into the rear bracket 3. In this instance, the cooling air passes spaces among the fins 53a of the heat sink 53 provided to the power circuit portion and heat generated in the power module of the power circuit portion connected to the heat sink 53 is released to the cooling air. For the heat sink 53 to release a large amount of heat generated in the power module, the fins 53a are installed in a closely-spaced manner.

A clearance larger than required for the structure or the assembling sequence is not provided between the heat sink 53 and the brush holder 54. Hence, foreign matter is readily trapped in a portion in which the heat sink 53 and the brush holder 54 are installed. Accordingly, foreign matter is not readily discharged to a ventilation portion beyond the portion in which the heat sink 53 of the power circuit portion and the brush 54 are installed and arrangement density of the members is originally low for the cooling air and foreign matter to readily flow. Consequently, there arises a problem that the fins 53a of the heat sink 53 are clogged and a corrosion product produced by salt water deposits.

Accordingly, the invention has a structure as follows. That is, an air passage is defined by a clearance between the brush holder 13 and the fins 33a of the heat sink 33, in which members other than the component members of the brush holder 13 are not provided to allow the cooling air to readily flow. Also, the fins 33a of the heat sink 33 of the power circuit portion 30 are provided with an opening 37 among the fins 33a so as to oppose the air passage. Owing to this structure, it becomes possible to obtain a rotary electric machine from which foreign matter, such as dust and salt water, can be readily discharged even when the foreign matter enters the heat sink 33 of the power circuit portion 30, and which achieves high cooling performance for the brushes 12 and heat-generating members.

FIGS. 3A-3C are views schematically showing an outward appearance of the power circuit portion 30, the brush holder 13, and the lid 36 of the case 34 of the first embodiment. FIG. 3A is a plane view, FIG. 3B is a perspective view, and FIG. 3C is a perspective view of a major portion. The brush holder 13 is formed of a brush storing portion 13a and a cover portion 13b integrally connected to the brush storing portion 13a, and is installed to be surrounded by the power circuit portion 30. The brush 12 stored in the brush holder 13 is installed so as to be in contact with the slip ring 11 installed at the rear end of the rotation shaft 6.

The heat sink 33 of the power circuit portion 30 is installed in such a manner that maximum-area surfaces of the fins 33a become parallel to a longitudinal direction of the rotation shaft 6. Also, a plurality of power modules are mounted on the heat sink 33 of the power circuit portion 30 and this mounting surface can be set either in a perpendicular direction or a horizontal direction with respect to the longitudinal direction of the rotation shaft 6.

Cooling air generated by the rear fan 9 formed of centrifugal fan and fixed to the rotor 7 enters from the openings 37, 38, and 39 of the case 34 installed on the rear side of the rotary electric machine of the invention, passes through the air passages 40, 41, and 42 formed in the vicinity of the heat sink 33 of the power circuit portion 30 and the brushes 12, and reaches the interior of the rear bracket 3 by passing through the cooling air inlets provided to the rear bracket 3. Then, the cooling air is discharged to the outside of the rear bracket 3 by the rear fan 9 formed of a centrifugal fan and fixed to the rotor 7 while cooling the winding portions of the rotor 7 and the stator 10.

In this instance, the air passage provided between the heat sink 33 of the power circuit portion 30 and the brush holder 13 is set so that a pressure loss in the flow path becomes smaller than that in the heat sink 33 of the power circuit portion 30. Accordingly, a flow rate of the cooling air on a plane on which is provided the power circuit portion 30 becomes highest in the air passage provided between the heat sink 33 of the power circuit portion 30 and the brush holder 13.

The rotary electric machine for vehicle is provided with a large number of ventilation openings so that cooling air generated by the rear fan 9 formed of a centrifugal fan and fixed to the rotor 7 efficiently flows in and out from the rear bracket 3. When the heat sink 33 of the power circuit portion 30, wiring members, and the brush holders 13 are installed in a closely-packed fashion, foreign matter, such as dust, and salt water enters the periphery of the portion in which the heat sink 33 of the power circuit portion 30 is installed and the brush holders 13, and eventually gives rise to inconveniences, such as the fins 33*a* are clogged and corrosion occurs due to salt water residing inside, in particular, electric erosion occurs in current-passing members.

The rotary electric machine according to the first embodiment of the invention has the air passage provided between the heat sink 33 of the power circuit portion 30 and the brush holder 13. Hence, foreign matter, such as dust, and salt water entering the heat sink 33 of the power circuit portion 30 or the like are drawn to a direction of the rotation center of the rotation shaft 6 by the cooling air that flows through the air passage at a high flow rate or current speed. It thus becomes possible to prevent the clogging of the fins 33*a* and the occurrence of corrosion. Herein, regarding a fin length of the heat sink 33 of the power circuit portion 30, the invention includes a case where the fin lengths are irregular to allow the cooling air to readily flow. Also, regarding a shape of the fins 33*a*, the invention includes a case where a single fin 33*a* is of a shape that becomes partially shorter on the downstream side of the cooing air.

Also, in comparison with an alternator, a field current passed to the brushes 12 is large particularly in the motor generator. In the rotary electric machine according to the first embodiment of the invention, a large volume of cooling air flows to the vicinity of the brush holders 13. Hence, an amount of heat released from the brush holders 13 is increased and there can be achieved another advantage that a temperature rise of the brushes 12 can be prevented.

Further, the portion in which the heat sink 33 of the power circuit portion 30 and the brush holders 13 are installed defines the flow path of the cooling air that flows from the rear side of the rotary electric machine 100 to the interior of the rear bracket 3, and the air passages 40, 41, and 42 are provided. Hence, a flow path resistance becomes smaller.

Consequently, a flow rate per unit time of the cooling air flowing to the interior of the rear bracket 3 becomes higher and cooling performance for heat-generating members inside the rear bracket 3, in particular, the field winding 14 of the rotor 7 and the armature winding 21 of the stator 10, can be enhanced.

FIGS. 4A-B are views schematically showing a brush holder shape in the rotary electric machine of the first embodiment. FIG. 4A is a perspective view and FIG. 4B is a developed perspective view. In the first embodiment of the invention, foreign matter entering the heat sink 33 of the power circuit portion 30 is drawn into the air passage provided between the heat sink 33 of the power circuit portion 30 and the brush holder 13 toward the brush holder 13.

It thus becomes necessary to have the brush holder 13 with high air-tightness to prevent foreign matter from entering the interior. Because the brush holder 13 is formed of the brush storing portion 13*a* and the cover portion 13*b* preventing entry of dust and water, it becomes possible to prevent entry of water to the interior of the brush holder 13.

As is shown in FIG. 4B, the brush holder 13 is formed of a single unit by fitting an engaging body 13*a*1 of the brush storing portion 13*a* with an engaging body 13*b*1 of the cover 13*b* from above in the direction indicated by an arrow.

Owing to this structure, air tightness high enough to prevent entry of dust and water can be secured by the brush holder 13 alone. For example, with a configuration in which the opening of the brush holder 13 and the rear bracket 3 or the case 34 are pressed against each other via water-proof packing, it becomes possible to prevent deterioration of air tightness caused by dimensional tolerances of the respective members and displacement of the installation position of the packing.

Because the brush holder 13 is divided to two component members, a degree of molding freedom of each member is enhanced, and it becomes possible to mold each member of a structure with a high degree of freedom. Further, because a die shape becomes simpler, the cost of the die can be reduced. Resin forming the brush holder 13 is PPS or PBT, which are excellent in terms of temperature and environmental resistance.

The brush storing portion 13*a* and the cover portion 13*b* forming the brush holder 13 may be formed of different materials. As heat conductivity of the resin forming the brush holder 13 becomes higher, an effect of lowering the brush temperature is exerted more. A high heat releasing effect can be achieved by setting heat conductivity to 0.6 (W/mK) or higher.

The lid 36 of the case 34 covering the power circuit portion 30 and the brush holder 13 is provided with an opening 37 and an opening 38 conforming to the outer shape of the brush holder 13 when viewed from the rear side. Accordingly, the flow of cooling air to the air passage 40 and the air passage 41 formed between the heat sink 33 of the power circuit portion 30 and the brush holder 13 is not blocked at all. Consequently, when foreign matter, such as dust, or salt water enters the vicinity of the power circuit portion 30 and the brush holders 13, the function of discharging the foreign matter and the salt water can be maintained.

Also, at the same time, besides the openings 37 and 38 provided so as to conform to the outer shape of the brush holder 13, the lid 36 of the case 34 is provided with a large opening 39 of substantially the same shape as the openings 37 and 38 on the outer side thereof so that cooling air also flows into the power circuit portion 30. Owing to this structure, a large volume of cooling air is provided to the vicinity of the brush holder 13 and the power circuit portion 30, and a cooling effect of the power semiconductor element formed of the power elements 30*a* and 30*b* or the brushes 12 can be achieved. The opening 39 is not necessary in a continuous singular form and the invention includes a case where the opening 39 is divided to two or more parts. In addition, the opening 38 is provided to the lid 36 of the case 34 in a surface portion facing radially about the rotation shaft 6.

There is no occasion that the rotary electric machine for vehicle mounted on the vehicle is set in such a manner that the rotation shaft 6 is perpendicular to the ground surface. Hence, by providing the opening to the side surface portion of the case, it becomes possible to discharge foreign matter, such as dust, and salt water entering the interior also in a radial direction of the rotary electric machine. In addition, because the opening area of the case is increased, an intake amount of cooling air of the rotary electric machine is increased and temperatures of the members in the rotary electric machine are lowered.

The fins 33*a* of the heat sink 33 of the power circuit portion 30 are tapered and become thinner toward the tip end. Because the fins 33*a* of the heat sink 33 of the power circuit portion 30 are tapered and become thinner toward the tip end, foreign matter, such as dust, and salt water can be readily discharged while preventing deterioration of the cooling performance of the power circuit portion 30 to the least extension possible. In this manner, saltwater and a corrosion product can be discharged efficiently. In the case of an axial-flow cooling method, when a resistance distribution across a radial flow path in the air passage is homogeneous, a volume of cooling air becomes smaller toward the rotation shaft 6. Herein, because the fins 33*a* are tapered, resistance of the cooling flow path becomes smaller toward the tip end. Consequently, a flow rate of cooling air entering the interior of the rear bracket 3 is increased and also a pressure loss in the radial direction becomes substantially homogeneous.

Also, in the rotary electric machine according to the first embodiment of the invention, cooling air is drawn to the interior of the rear bracket 3 by the rear fan 9 formed of a centrifugal fan and fixed to the rotor 7. In this instance, for example, when a loss in the flow path of the power circuit portion 30 serving as the flow path of the cooling air is homogeneous across a plane perpendicular to the longitudinal direction of the rotation shaft 6, a flow rate of the cooling air becomes lower toward the center of the rotation shaft 6. This is because, in the rotary electric machine of the invention in which the cooling air is taken inside from the rear side of the rotary electric machine and discharged in the radial direction of the rear bracket 3, the cooling air flow path becomes longer toward the center of the rotation shaft 6 in the plane perpendicular to the longitudinal direction of the rotation shaft 6 and a loss of the cooling air in the flow path becomes larger.

In the first embodiment of the invention, the portion in which are installed the fins 33a of the heat sink 33 of the power circuit portion 30 is of substantially a uniform shape in the direction perpendicular to the flow path and therefore has a structure in which it becomes more difficult for cooling air to flow as the flow path nears to the rotation shaft 6 (nears to the fin tip end). Contrary to this structure, because the fins 33a of the heat sink 33 are tapered and become thinner toward the tip end, a flow rate across a plane perpendicular to the flow path can be made substantially homogeneous by avoiding an inconvenience that a flow rate of the cooling air decreases also at the tip end of the fins 33a of the heat sink 33.

It thus becomes possible to discharge foreign matter, such as dust, and salt water efficiently. It should be noted that this advantage is attributed to an increase of a flow rate of cooling air at the tip end of the fins 33a and a total amount of in-flow cooling air that flows to the interior of the rear bracket 3 of the rotary electric machine increases. Consequently, cooling performance for the brush holders 13 and the winding portions of the rotor 7 and the stator 10 can be enhanced.

As has been described, according to the first embodiment, even in a case where foreign matter, such as dust and a corrosion product, enters the vicinity of the heat sink 33 connected to the power circuit portion 30, the connection portion of the armature winding 21 to the power circuit portion 30, or the brush holders 13, the foreign matter does not deposit in a portion in which the heat sink 33 of the power circuit portion 30 and the brush holder 13 are installed in the rotary electric machine. It thus becomes possible to obtain a rotary electric machine in which electric erosion of current-passing members and clogging of the heat sink 33 or the cooling air passage can be prevented.

Also, the foreign matter entering the rotary electric machine flows into a ventilation portion beyond the portion in which the heat sink 33 of the power circuit portion 30 and the brush holder 13 are installed where arrangement density of members is originally low for the cooling air and foreign matter to readily flow, and discharged to the outside of the rear bracket 3 by the rear fan 9 fixed to the rotor 7. Also, ventilation resistance of the cooling air flowing in the direction from the rear side of the rotary electric machine to the rear bracket 3 becomes extremely small in the vicinity of the air passage defined by the clearance between the brush holder 13 and the heat sink 33 of the power circuit portion 30. Hence, a volume per unit time of cooling air flowing into the rear bracket 3 increases and the cooling performance for the brushes 12 and the winding portions of the rotor 7 and the stator 10 can be enhanced. It thus becomes possible to obtain a rotary electric machine that not only enhances environmental resistance performance but also achieves high cooling performance.

Second Embodiment

Figure 5A:
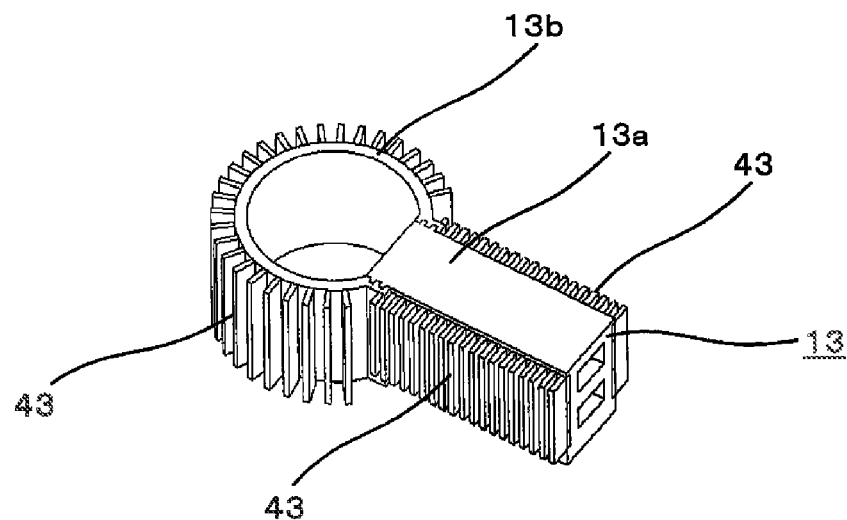
FIG. 5A is a perspective view of the brush holder and FIG. 5B is a perspective view of the brush holder equipped with a case.
Figure 5B:
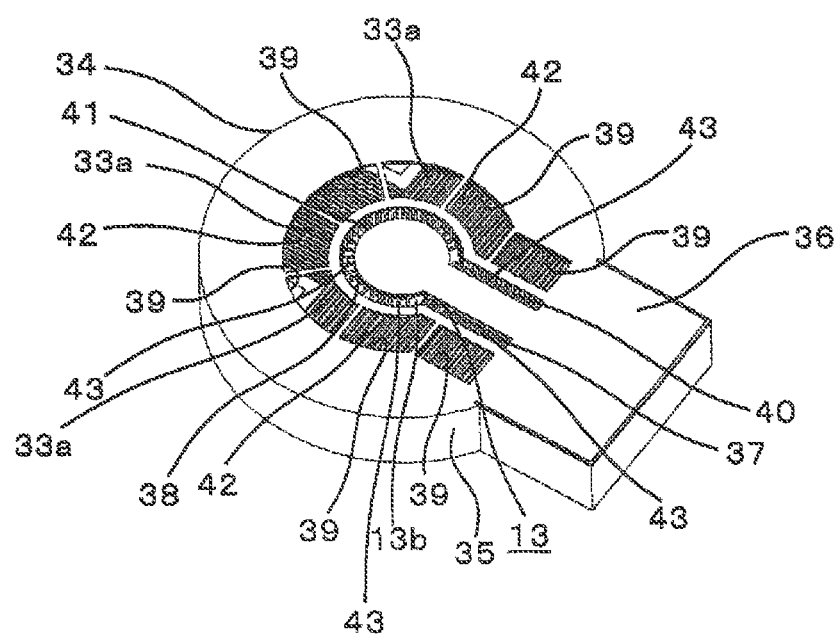

A second embodiment of the invention will be described according to FIGS. 5A-5B. FIGS. 5A-5B are views schematically showing an outward appearance of a brush holder in a rotary electric machine according to the second embodiment of the invention.

The brush holder 13 has foreign matter entry prevention plates 43 in an outer peripheral portion of the brush storing portion 13a or the cover portion 13b or the both. By providing the foreign matter entry prevent ion plates 43 in the air passage 39, it becomes possible to prevent entry of foreign matter, such as dust, from the opening 37 provided to the lid 36 of the case 34, through which cooling air flows in. Also, the foreign matter entry prevention plates 43 are, for example, integrally molded with the brush holder 13.

Owing to this structure, not only can attachment strength of the foreign matter entry prevention plates 43 be enhanced, but also the manufacturing costs required for the attachment can be reduced. Also, because the brush holder 13 and the foreign matter entry prevention plates 43 are molded into a single piece, contact heat resistance between the molding resin of the brush holder 13 and the foreign matter entry prevention plates 43 can be smaller.

Consequently, heat generated at the brush 12 is efficiently transmitted to the foreign matter entry prevention plates 43 installed in the air passage 39 via the brush holder 13, and released to cooling air from the surfaces of the foreign matter entry prevention plates 43. It thus becomes possible to obtain an advantage that a temperature rise of the brushes 12 can be prevented.

The foreign matter entry prevention plates 43 integrally molded with the brush holder 13 can be shaped like a plate (shown in FIGS. 5A-5B) or a pin. In the case of a plate shape, a pitch between the plates is set larger than a fin pitch of the heat sink 33.

Accordingly, a flow path resistance of the air passage 39 becomes smaller than that of the heat sink 33 and a flow rate or a current speed of the cooling air flowing through the air passage 39 defined by the clearance between the heat sink 33 and the brush holder 13 is increased in comparison with the cooling air flowing among the fins 33a of the heat sink 33. Hence, a function of efficiently discharging foreign matter, such as dust, and salt water is exerted.

FIGS. 5A-5B show an example where flat plates are aligned at regular intervals around the brush holder 13. It should be appreciated, however, that the foreign matter entry prevention plates 43 of the invention include those aligned in a mesh fashion by which the plates are orthogonal to each other when viewed from the rear side or in a hexagonal honey-come fashion. When arranged as above, the structural strength or vibration resistance of the foreign matter entry prevention plates 43 can be increased. Also, by aligning the foreign matter entry prevention plates 43 in a mesh fashion or a honey-comb fashion, a flow of the cooling air passing by this portion can be rectified, so that the cooling air is allowed to efficiently flow into the rear bracket 3.

The foreign matter entry prevention plates 43 integrally molded with the brush holder 13 are formed of resin forming the brush holder 13, an insert terminal, or an extruded part. In a case where the foreign matter entry prevention plates 43 are molded from resin forming the brush holder 13, the structure of the foreign matter entry prevention plates 43 can be formed at a time when the brush holder 13 is molded. Hence, it becomes possible to cut the manufacturing costs and the material costs incurred by newly providing an attachment step or a bonding material.

In a case where the foreign matter entry prevention plates 43 are formed of an insert terminal formed of a metal member, not only does it become possible to increase strength of the foreign matter entry prevention plates 43, but it also becomes possible to enhance heat-releasing performance of the brush holder 13 because a metal member having high heat conductivity is used for the foreign matter entry prevention plates 43.

Also, by incorporating the foreign matter entry prevention plates 43 inside the brush holder 13 as a framework, the structural strength of the brush holder 13 can be increased. Also, even when the brush holder 13 is exposed to hot atmosphere so high that the brush holder 13 is softened or undergoes creep deformation, shape maintaining performance can be increased.

Also, a portion of the insert terminal protruding from the brush holder 13 as the foreign matter entry prevention plates 43 is molded by sheet-metal processing or partial cutting and bending in the terminal. In a case where the foreign matter entry prevention plates 43 are molded from a metal extruded part, the foreign matter entry prevention plates 43 can be shaped like a heat sink having high heat conductivity, in which case an effect of lowering the brush temperature can be more significant. Also, the manufacturing costs of the foreign matter entry prevention plates 43 per se can be reduced.

The foreign matter entry prevention plates 43 are formed of a resin molded article molded separately from the resin forming the brush holder 13. In a case where the foreign matter entry prevention plates 43 are formed of a resin molded article molded separately from the resin forming the brush holder 13, it becomes possible to form the foreign matter entry prevention plates 43 per se into a complicated shape.

By using resin having high heat conductivity as resin forming the foreign matter entry prevention plates 43, heat-releasing performance of the brush holder 13 can be enhanced. In particular, when high heat-releasing performance is required, the heat conductivity of resin is set to 0.6 (W/mK) or higher.

Also, by using resins having close linear expansion coefficients as resin forming the brush holder 13 and the resin forming the foreign matter entry prevention plates 43, it becomes possible to enhance durability against temperature cycles in comparison with a case where the foreign matter entry prevention plates 43 are made of metal.

Regardless of by which manufacturing method or from which component member the foreign matter entry prevention plates 43 are formed, the member forming the foreign matter entry prevention plates 43 is not limited to a single member, and the invention includes those formed by combining more than one member.

It should be appreciated that the respective embodiments of the invention can be combined without any restriction and the respective embodiments can be modified and omitted as the need arises within the scope of the invention.

INDUSTRIAL APPLICABILITY

The invention is suitable to realize a rotary electric machine from which foreign matter, such as dust, and a corrosion product can be readily discharged and in which a cooling operation can be performed efficiently.

The invention claimed is:

1. A rotary electric machine including a rotation shaft supported on a housing in a rotatable manner, a stator fixed to the housing and having an armature winding, a rotor fixed to the rotation shaft and having a field core and a field winding, a brush used to supply a field current to the field winding, a brush holder holding the brush, a power circuit portion fixed to a rear side of the housing and connected to a heat sink having fins, and a case covering the power circuit portion and the brush holder, the rotary electric machine being characterized in that:
   an air passage is provided between the brush holder and the fins of the heat sink; and
   an opening is provided to the case so as to cover component members of the brush holder in a shape conforming to an outer peripheral portion of the brush holder, from which cooling air is allowed to pass through the air passage,
   wherein the brush holder is formed of a brush storing portion and a cover portion, and
   wherein the brush holder is provided with foreign matter penetration prevention plates in an outer peripheral portion of the brush storing portion or the cover portion or the both, the foreign matter penetration prevention plates preventing entry of foreign matter through the opening.

2. The rotary electric machine according to claim 1, characterized in that:
   the case is provided with a large opening of substantially a same shape as the opening in the outer peripheral portion of the opening.

3. The rotary electric machine according to claim 2, characterized in that:
   the fins of the heat sink are tapered and become thinner toward tip ends.

4. The rotary electric machine according to claim 1, characterized in that:
   the fins of the heat sink are tapered and become thinner toward tip ends.

5. The rotary electric machine according to claim 1, characterized in that:
   the foreign matter penetration prevention plates are formed of molding resin, an insert terminal, or a metal member integrally molded with resin.

6. The rotary electric machine according to claim 1, characterized in that:
   the foreign matter penetration prevention plates are formed of a resin molded article molded separately from component members of the brush holder.

* * * * *